Figure 1:
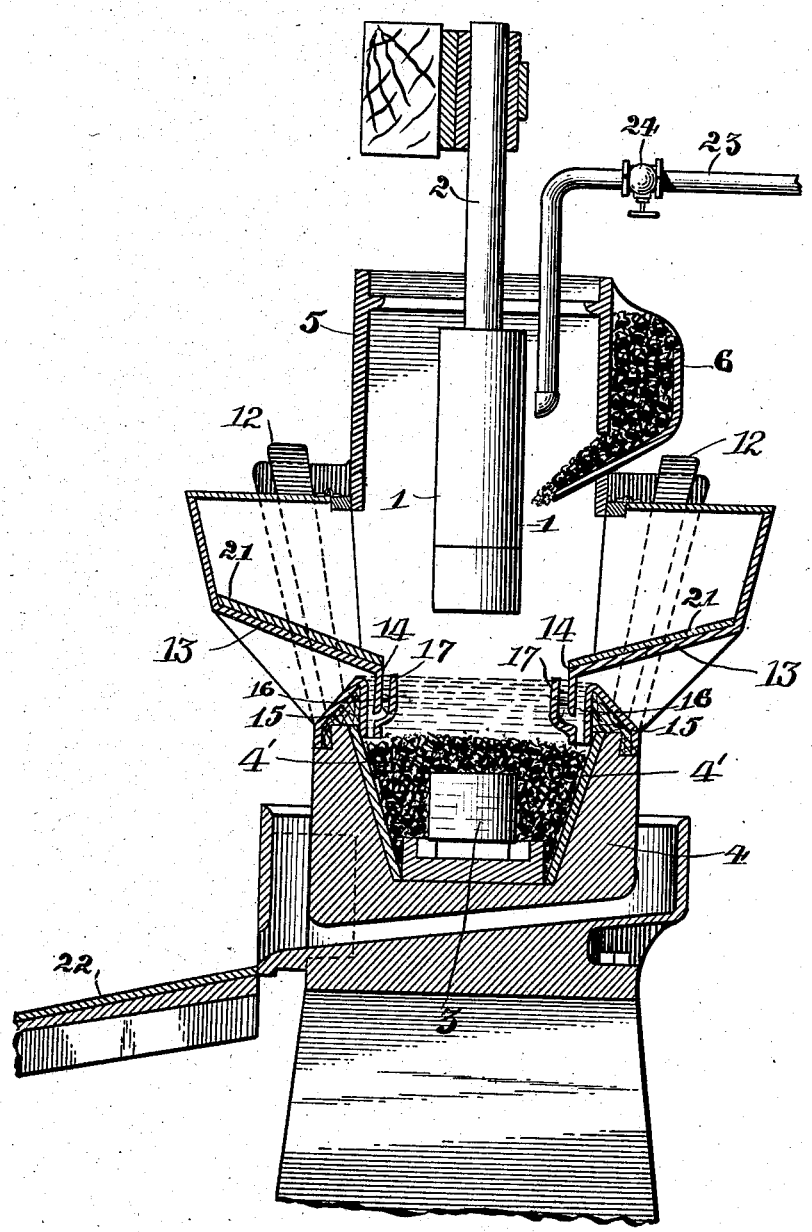

No. 893,243. PATENTED JULY 14, 1908.
D. N. HOOD.
APPARATUS FOR TREATING ORES.
APPLICATION FILED AUG. 15, 1906.

5 SHEETS—SHEET 1.

Attest:
Edw. W. Vaill Jr.
Thos. J. Maguire

Inventor:
Duncan N. Hood
by Betts Sheffield Bentley Betts
Attys

No. 893,243.

PATENTED JULY 14, 1908.

D. N. HOOD.
APPARATUS FOR TREATING ORES.
APPLICATION FILED AUG. 15, 1906.

5 SHEETS—SHEET 2.

Attest:
Edw. W. Vaill Jr.
Thos. J. Maguire.

Inventor:
Duncan N. Hood
by Betts Sheffield Bentley Betts
Attys

No. 893,243. PATENTED JULY 14, 1908.
D. N. HOOD.
APPARATUS FOR TREATING ORES.
APPLICATION FILED AUG. 15, 1906.
5 SHEETS—SHEET 3.
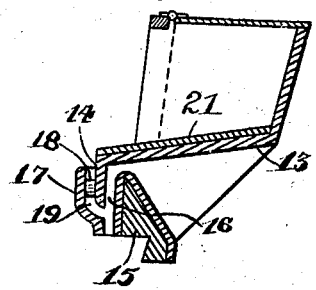
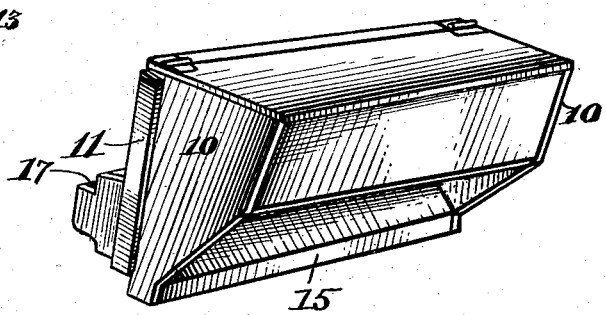
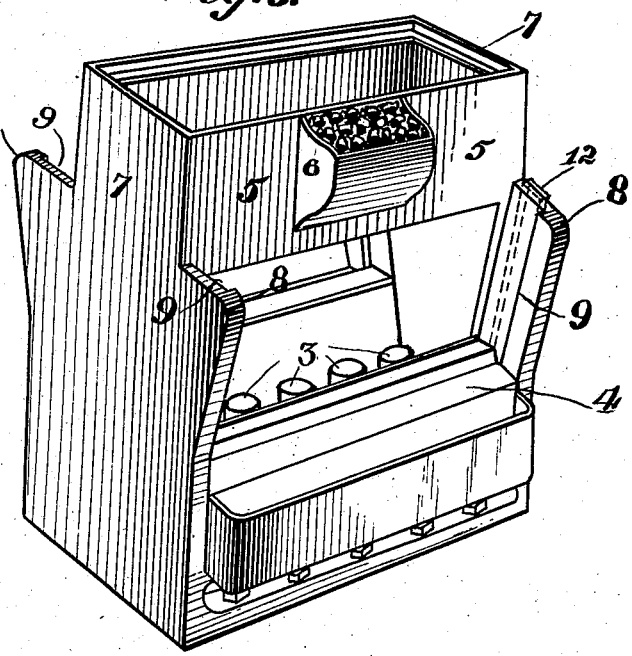
Attest:
Edw. W. Vaill Jr.
Thos. J. Maguire
Inventor:
Duncan N. Hood
by Betts Sheffield Bentley Betts
Attys No. 893,243. PATENTED JULY 14, 1908.
D. N. HOOD.
APPARATUS FOR TREATING ORES.
APPLICATION FILED AUG. 15, 1906.

5 SHEETS—SHEET 4.

Attest:
Edw. W. Vaill Jr.
Thos. J. Maguire

Inventor:
Duncan N. Hood
by Betts Sheffield Bentley Betts
Attys

No. 893,243. PATENTED JULY 14, 1908.
D. N. HOOD.
APPARATUS FOR TREATING ORES.
APPLICATION FILED AUG. 15, 1906.
5 SHEETS—SHEET 5.
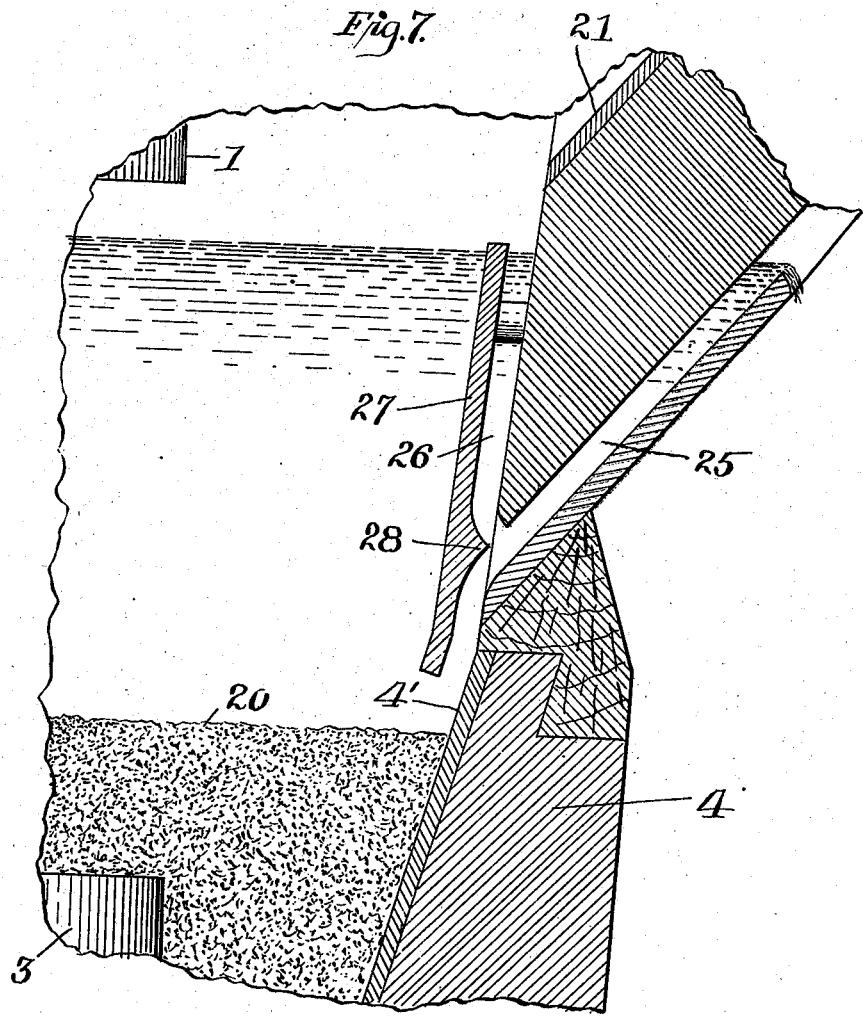
WITNESSES:
Edw. W. Vaill Jr.
Thos. J. Maguire
INVENTOR.
Duncan N. Hood
BY Betts Sheffield Betts
ATTORNEYS.

UNITED STATES PATENT OFFICE.

DUNCAN N. HOOD, OF NEW YORK, N, Y., ASSIGNOR TO HOOD PROCESS COMPANY, A CORPORATION OF ARIZONA TERRITORY.

APPARATUS FOR TREATING ORES.

No. 893,243.  Specification of Letters Patent.  Patented July 14, 1908.

Application filed August 15, 1906.  Serial No. 330,665.

*To all whom it may concern:*

Be it known that I, DUNCAN N. HOOD, a citizen of the United States, and a resident of the city of New York, county and State of New York, have invented certain new and useful Improvements in Apparatus for Treating Ores, of which the following is a full, clear, and complete disclosure.

I have filed in the United States Patent Office two applications, Serial Nos. 278,692, filed September 16, 1905, for improvements in processes for treating ores, and 303,775, filed March 2, 1906, for improvements in apparatus for treating ores. The subject-matter of these applications comprise, briefly, the treatment of ore by subjecting the ore, during the process of crushing, pulverizing or grinding, to the action of upwardly flowing currents of water or other liquid, so that particles up to certain definite maximum sizes and character for the different materials contained in the ore are discharged, while other particles of larger sizes and different character are retained and re-crushed to the requisite sizes to be discharged. The broad features of these prior applications involve the use of channels of uniform cross-sectional area of a predetermined length, extending upwardly from the interior of a mortar of a stamp or roller mill, so that the water which is fed into the mortar, during the operation of the crushing, may flow outwardly through said channel, thereby discharging particles as above referred to, which particles are substantially proportioned to their respective specific gravities. In said applications I have shown the outflow channels as being inclined upwardly and outwardly, and I have also shown substantially vertical guard strips opposite the lower ends of said channels.

The present application involves the same broad principles as are embodied in the two prior applications above mentioned. The present application, however, covers modified arrangements of channels which I consider in some respects, and for some uses, to be more advantageous than that shown in said prior applications. Briefly stated, the arrangement of channels forming these features of my invention comprises a discharge channel, preferably vertical, through which the water may flow upward, and a guard or strip forming a secondary channel which conducts water and particles of ore from the splash boards or the amalgamated plates into the discharge channel at an angle to the direction of flow of the discharge channel. The advantages of this arrangement will be hereinafter more fully referred to.

Figure 2:
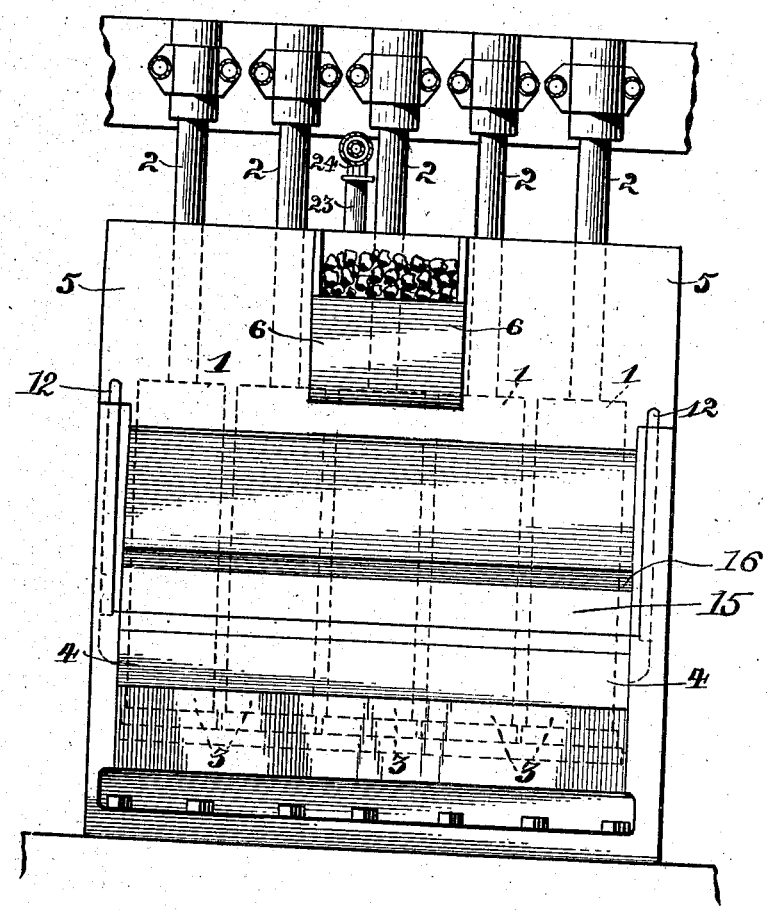
Figure 6:
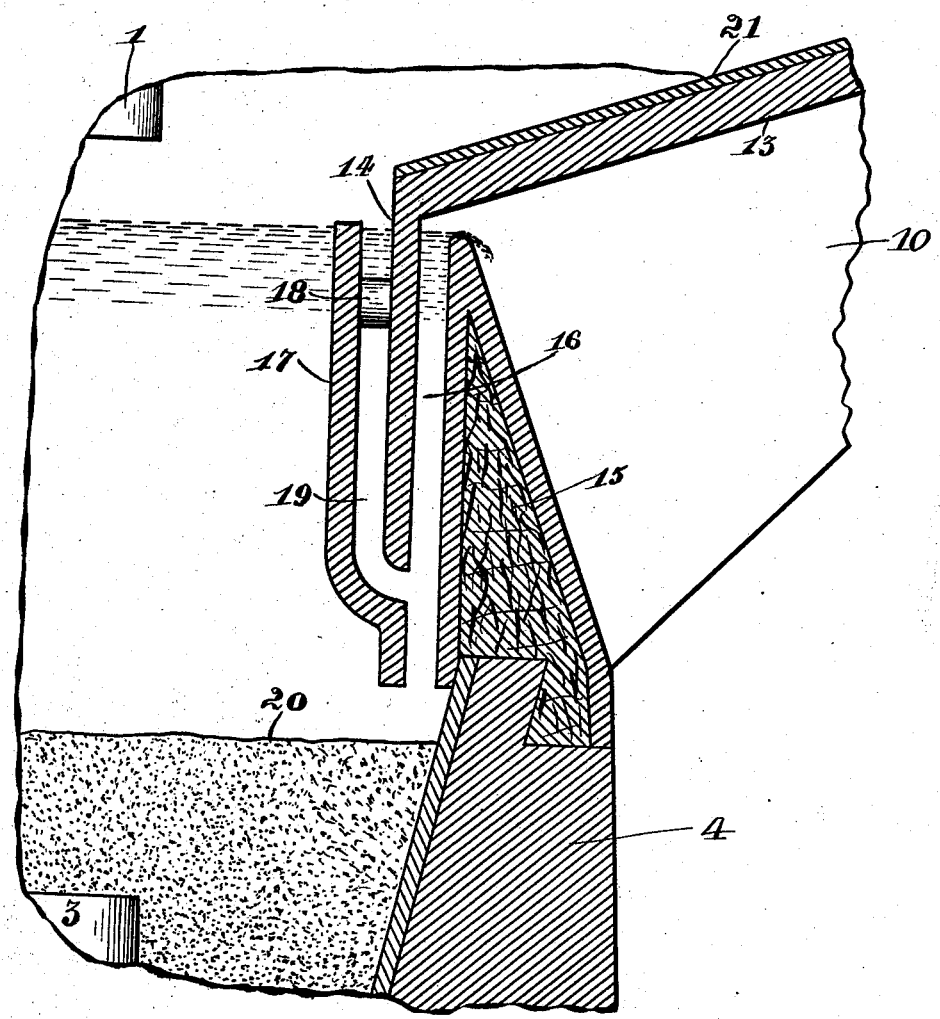

For a full, clear and exact description of this form of my invention, reference may be had to the following specification and to the accompanying drawing forming a part thereof, of which Figure 1 is a vertical-sectional view of this form of my invention taken substantially upon the central vertical line in Fig. 2 and showing my improvement applied to a stamp battery. Fig. 2 is a rear elevation thereof. Fig. 3 is a transverse-sectional view, showing the removable part of my apparatus detached from the crushing or grinding mechanism. Fig. 4 is a perspective view of the same. Fig. 5 is a perspective view of the casing of the crushing mechanism showing the separable portion of the apparatus removed. In Figs. 1, 3 and 4 the separating or discharge portions of the apparatus are shown somewhat exaggerated in scale, so as to indicate the general construction more clearly and to allow of reduction of the drawings. Fig. 6 is an enlarged detailed-sectional view of the separable portion of my apparatus in position upon the mortar, drawn to scale, and of such proportions as I at present consider preferable, for some uses. Fig. 7 is a similar view of another modification.

Referring to the drawings, the numeral 1 indicates ore stamps or plungers of the usual form and construction, operated by means of stems, 2, which are given the usual vertical reciprocating movement. The stamps 1 are adapted to coöperate with and strike upon blocks or dies, 3, located within the mortar, 4. The mortar, 4, consists of a trough-shaped receptacle having inclined sides, 4'. Above the mortar, 4, is a rectangular box or casing, 5, which is usually provided with a suitable ore feeding device or hopper, 6. The ends, 7, of the box or frame, 5, are formed by extensions of the ends of the mortar, 4, and extend laterally outward so as to form the ears or wings, 8, which are provided with suitable grooves, 9, within which the parts supporting the ore separating portion of the apparatus are held in position. A supply pipe, 23, is also provided, through which the water passes that is mixed with the ore to form the pulp in the mortar. This supply pipe is provided with a valve, as indicated at 24. This valve regulates the amount of water fed to the mortar, and for this purpose the water goes to the valve under a constant head, which may be maintained by any well known means for producing a constant head. The parts thus far described are substantially those in common use in connection with ore crushing or grinding devices. In the place of the screens that are usually used with such apparatus and which are retained in position so as to receive the splash from the crushing or grinding devices, I substitute the ore separating portion of my invention. In this form of invention, the ore separating portion of the apparatus consists of a suitable box or frame substantially as illustrated in Fig. 4. This box comprises the ends, 10, which are provided with cleats, 11, adapted to fit within the grooves, 9, in the wings, 8, of the casing, 5, of the ore crushing apparatus. Wedges, 12, are also adapted to be inserted in these grooves or recesses to force the cleats, 11, inward toward the casing, 5, so as to form water-tight joints between the casing and box.

An inclined plate or board, 13, extends transversely between the ends, 10, and terminates in a downwardly extending lip, 14. The bottom piece, 15, extends between the lower ends of the sides, 10, and is so shaped as to form with the lip, 14, just referred to, a vertical channel, as indicated at 16. This bottom piece is preferably substantially triangular in cross section, as indicated in Figs. 3 and 6, and may be made of any suitable material, although I have shown the same as consisting of a bar of wood, covered on its exposed sides with sheet metal. The bottom piece, 15, is adapted to rest on the upper edge of the mortar, 4, and form therewith a water-tight joint, it being understood that the usual "chock-blocks" may be inserted to vary the height of the discharge apparatus. A guard strip, 17, which is supported on the lip, 14, by means of suitable studs or brackets, 18, extends parallel with said lip, 14, and forms in connection with said lip a substantially vertical channel, having its lower end curved toward the channel, 16, and meeting the same at an angle. The lower edge of the strip, 17, after curving inward toward the bottom piece, 15, then extends downward and forms, with the bottom piece, 15, practically an extension of the channel, 16.

It will now be seen that the three parts consisting of the strip, 17, the lip, 14, and the bottom piece, 15, form two channels, 16 and 19. The channel, 16, is substantially vertical and the channel, 19, is also substantially vertical in its upper portion, but curves toward the channel, 16, at its lower end at a comparatively obtuse angle. It should be noted that the upper end of the channel, 19, is located directly below the end of the inclined board, 13, which receives the splash from the crushing or grinding devices, in this instance the stamps, 1. The lower end of the channel, 16, is located slightly above the normal level, 20, of the crushed pulp in the mortar.

I will not here give a minute description of the effects of the flow of water within these channels, as the same is set forth in detail in the two applications heretofore filed by me. It will be seen, however, that the water which flows from the splash boards, 13, will run downward into the channel, 19, and will cause downward currents therein opposite the respective stamps, when the same have dropped. This current will intersect the current in the channel, 16, caused by the downward motion of the stamps within the liquid and the outflow which is the result of the liquid being supplied to the mortar. The successive and equally timed motions of the stamps tend to neutralize the displacements of the water. The guard strip 17 and the relatively small area of the channels cause the outflowing current in the channels to be substantially constant in velocity. This is particularly evident if it is borne in mind that the walls forming the channels are continuous for the whole length of the mortar, and thus allow the current to be evenly distributed in the channels without interference. The splash boards, 13, may be provided with the usual amalgamated plates, 21. Particles of gold or other metal which are acted upon by said amalgamated plates will adhere thereto, while other particles of gold and other materials will be carried by the water into the channel, 19. Larger particles of materials, which are not carried by the water into the channel, 19, will be projected beyond the upper edge of the strip, 17, and will fall into the main body of the mortar and there be re-crushed. The particles of minerals and metals, which are carried downward by the currents in the channel, 19, will then be brought into the channel, 16, in which there is an upward current caused by the crushing apparatus and by the outflow as above described. At the confluence of these two currents just below the inner edge of the lip, 14, the particles in the channel, 19, will come substantially to rest, as far as any vertical motion is concerned, but the upward current in the channel, 16, will then immediately act thereon and cause the same to be carried upward, if the size and weight of the particles are such as to cause them to have a lesser sinking velocity than the rate of upward flow of the current in said channel, 16. Larger and heavier particles which have a greater sinking velocity than the rate of the current in the channel, 16, will sink downward and be discharged at the lower end of said channel into the main body of the mortar, where they will become recrushed to smaller sizes. Particles which are contained within the body of the pulp, 20, which is constantly being agitated by the crushing or grinding devices, will be carried upward by the discharge through the channel, 16, if their size and weight is such as to cause them to have a sinking velocity less than the velocity in said channel. All particles which have reached their maximum sinking velocity in the channel, 16, will either be discharged by the current therein or will sink and be returned to the mortar, and the particles which are discharged will be carried out of the mortar over the upper edge of the bottom piece, 15, and may then be submitted to the usual amalgamated plates, 22, in the usual and well known manner.

There are two principal advantages resulting from this construction; one is, that the discharge channel within which the sorting or separation takes place is vertical. This prevents the particles from tending to adhere to or roll down the sides of the channel, and also requires a smaller volume of water to obtain the same separating effect than would be required when said channels are inclined. A second advantage in the form of channels shown resides in the fact that the inner channel, which receives the water from the splash boards or amalgamated plates, meets the discharge channel at substantially a right angle, and causes the particles therein to move horizontally and to have practically no downward component, and said particles are subjected to the action of the current in the discharge channel with very little, if any, downward velocity. The particles are, therefore, practically at rest as concerns any vertical motion when the current in the discharge channel commences to act upon them, and there is little, if any, tendency to have them projected toward the lower end of the discharge channel, before the current therein has had sufficient time to act upon them. This allows the particles to attain their maximum sinking velocities in the discharge channel, without being materially affected by their motion, when submitted to it. This increases the efficiency and accuracy of the separating or sorting feature of the device.

In Fig. 7 I have shown another modification of my prior apparatus, in which the outflow channel is inclined, but embodies the feature of the angle between said channel and the secondary channel.. In this figure the numeral 25 indicates the inclined channel, and the numeral 26 indicates the secondary channel. It should be noted that the guard strip, 27, which forms the secondary channel is provided with an offset, 28, which causes the secondary channel to intersect the outflow channel, instead of constituting a substantially straight passage along the guard strip. The result, that the particles carried in the secondary channel are subjected to the action of the current in the discharge channel, without downward motion, is also obtained by this form of the discharge apparatus.

It will be obvious that the discharge and separating portions of my invention are also applicable to roller mills such as those of the Huntington and Chilian type, usually intended for screen discharge, it being necessary only to design the discharge portion of the apparatus so as to have it conform to the shape of the mortar or receptacle within which the crushing or grinding takes place, while maintaining the discharge channel of uniform cross-sectional area. Such adaptation would be well within the knowledge of one skilled in the art, and therefore does not require specific illustration.

All the principles of my invention, as described in my prior applications above mentioned, are clearly applicable to these forms of my invention.

I wish it to be understood that I do not desire to be limited to the exact details of construction shown and described herein, for obvious variations will occur to persons skilled in the art which may be embodied in the apparatus, without departing from the spirit and scope of my invention.

Having thus described my invention, what I claim and desire to protect by Letters Patent is:

1. In combination with an ore disintegrating apparatus, a receptacle in which the disintegration takes place, parts forming an upwardly extending outflow channel of uniform cross-sectional area and also forming a secondary channel intersecting said outflow channel in a substantially horizontal direction, and means for providing a supply of liquid to said receptacle at a uniform rate.

2. In combination with an ore disintegrating apparatus, a receptacle in which the disintegration takes place, parts forming a substantially vertical outflow channel of uniform cross-sectional area and also forming a secondary channel intersecting said vertical channel at substantially a right angle thereto, and means for providing a supply of liquid to said receptacle at a uniform rate.

3. In combination with an ore disintegrating apparatus, a receptacle in which the disintegration takes place, parts forming a substantially vertical outflow channel and also forming a secondary channel intersecting said vertical channel at substantially a right angle thereto and at a point adjacent its lower end, and means for providing a supply of liquid to the said receptacle at a uniform rate.

4. In combination with an ore disintegrating apparatus, a receptacle in which the disintegration takes place, parts forming a substantially vertical outflow channel of uniform cross-sectional area and also forming a secondary channel intersecting said vertical channel at a point adjacent its lower end, an inclined splash board having an inner edge located above the upper end of said secondary channel and means for providing a supply of liquid to said receptacle, at a uniform rate.

5. In combination with an ore disintegrating apparatus, a receptacle in which the disintegration takes place, splash boards located above the edges of said receptacle, downwardly extending substantially vertical lips carried by the inner edges of said splash boards and forming, with the upper edges of said receptacle, substantially vertical outflow channels, horizontally extending strips located within and parallel to said lips and forming with the latter secondary channels, which intersect said outflow channels and also forming prolongations of said outflow channels, and means for providing a uniform supply of a liquid to said receptacle.

In witness whereof I have signed my name in the presence of two witnesses this 11th day of August, 1906.

DUNCAN N. HOOD.

Witnesses:
EDWARD W. VAILL, Jr.,
JAMES J. COSGROVE.